April 27, 1943.  A. W. LARCHAR  2,317,687
PRODUCTION OF HOLLOW ARTICLES FROM POLYMERIC COMPOSITIONS
Filed April 4, 1940
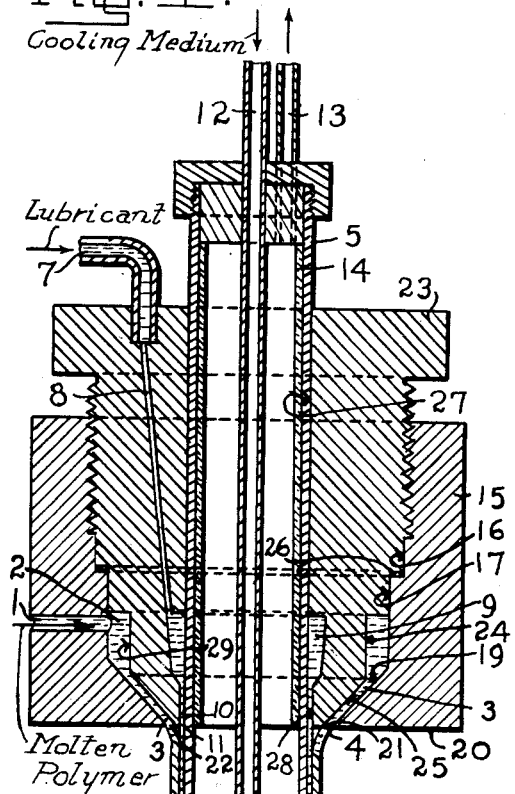
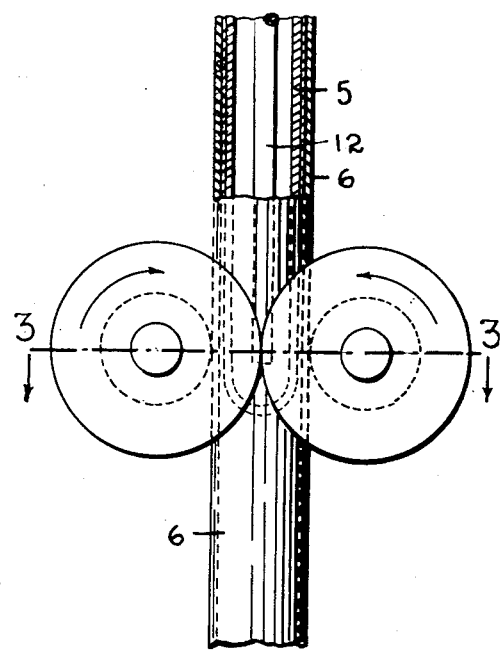
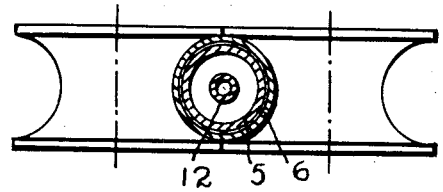
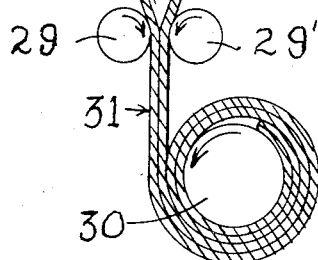
Inventor
Arthur Whitney Larchar
By Harold A. Jewett
Attorney Patented Apr. 27, 1943

2,317,687

UNITED STATES PATENT OFFICE 2,317,687

PRODUCTION OF HOLLOW ARTICLES FROM POLYMERIC COMPOSITIONS

Arthur Whitney Larchar, Wilmington, Del., assignor to E. I. du Pont de Nemours & Company, Wilmington, Del., a corporation of Delaware Application April 4, 1940, Serial No. 327,903

15 Claims. (Cl. 18—14)

This invention relates to the production of hollow articles consisting of or comprising synthetic polymers of those types which are capable of being formed into pliable fibers. Such polymers will be designated hereinafter as fiber-forming synthetic polymers. More particularly, this invention relates to hollow tubular structures comprising such polymers, and to a method and apparatus for use in manufacturing such structures. Still more particularly, this invention relates to the production of seamless tubing of controlled diameter and wall thickness, from materials comprising members of that class of fiber-forming polymers which are known as synthetic linear superpolyamides and are described, for example, in U. S. Patents 2,071,250, 2,071,253, 2,130,523, and 2,130,948.

It is conventional to manufacture artificial sausage casings composed of cellulose hydrate by extruding viscose through an annular die directly into a coagulating bath which precipitates the hydrate in the form of tubing. When such or analogous methods are employed with polymers of the type of the said polyamides, however, results are obtained which are disadvantageous from a number of standpoints. For instance, the walls of the tubing are apt to be opaque. Moreover, the use of toxic or corrosive solvents usually is necessary; and the expense and inconvenience of a liquid coagulating bath is unavoidable.

It is conventional, also, to manufacture tubing of rubber by merely extruding the rubber in a plastic state into a congealing medium, but when the said polyamides, for instance, are heated to fluidity and then merely extruded in the form of tubing, into a congealing medium, the walls tend to collapse and neck-down to a serious extent, thus rendering dimensional control and the attainment of uniformity very difficult. The reason for this result is that the polyamides are mostly crystalline in behavior, and have relatively sharp melting points, so that it usually is necessary to melt them in order to make them sufficiently fluid for being extruded at all, whereas once they have reached the molten state, they are much more fluid than is the aforesaid plastic rubber.

This invention therefore has as an object the production of seamless hollow articles or tubing, of controlled diameter and wall thickness, by means of a novel process and apparatus adapted to the fashioning of the aforesaid synthetic polymers into such articles or tubing. Further objects will appear hereinafter.

Broadly, the invention consists in novel steps attendant upon the application of a film or layer of fluid composition comprising fiber-forming synthetic polymer to a shaping or shape-preserving member, the setting up of a solid structure or film from the said composition, the effecting of a sufficiently loose contact between the said structure or film and the said shaping member, and the removal therefrom of the said structure or film, intact.

In a preferred embodiment of the invention, lubricant is applied to a cooled mandrel or forming member; molten, fiber-forming synthetic linear polyamide is distributed uniformly over the lubricant and is congealed by cooling; and the resulting tubular structure is removed from the mandrel.

The invention, as exemplified in the said preferred embodiment, may be understood most readily from the following detailed description, when considered in connection with Figs. 1, 2 and 3 of the accompanying drawing, in which:

Fig. 1 is an elevational view, partly in section, of a preferred form of extrusion head and means for removing the tubing for carrying out the process of the invention; and Figs. 2 and 3 respectively are elevation and plan views of take-off pulleys showing a preferred means for removing the tubing and a portion of the tube-forming mandrel as shown in Fig. 1.

Referring to Fig. 1, pre-melted polymer is delivered at a uniform rate under superatmospheric pressure to the tube-forming head through channel 1. This head is maintained at a temperature level preferably 5–25° C. above the melting point of the polymer by heating means which are not shown. The molten polymer passes via conduit 1 to annular duct 2 which serves as a distributing header for conical channel 3 from which it emerges at 4 and is cast on and completely sheathes cooled, lubricated mandrel or forming member 5. The film of polymer which envelops mandrel 5 is chilled rapidly and congealed to a tubular structure 6 which is continuously removed from the mandrel. It is preferred that the film of polymer be cooled to the solid state within one second from the instant of its extrusion. The tubing 6 may be pulled off by flattening to a band 31 below the mandrel and passing the band through suitable rotating pinch rolls 29, 29', the band 31 being continuously wound on wind-up roll 30. An alternative method is illustrated in Fig. 2. In this case, the recessed faces of two rotating pulleys engage the surface of the solidified tubing 6 and transport it along the mandrel or forming member 5.

A lubricant derived, for example, from petroleum, is charged to the extrusion head at 7 and hence passes through hole 8 to annular duct 9 which surrounds a portion of mandrel 5. From 9 the lubricant is forced down through the narrow annulus 10 and emerges from the base of the extrusion head at 11 on the mandrel under the molten polymer.

The portion of the mandrel which protrudes below the base of the extrusion head is internally cooled by water or other suitable media brought to the base of the mandrel via tube 12 and discharged at 13. An insulating liner 14 is used to cut down the loss of heat from the extrusion head to the cooling medium.

The body 15 of the aforesaid tube-forming head depicted in Fig. 1 contains cylindrical longitudinal recesses 16 and 17. The former has an upper threaded portion and the latter terminates in countersunk coned surface 19. Coned surface 19 is intersected by the base 20 of body 15 to give a sharp edged hole 21 which forms the outside lip of the annular discharge nozzle 22. Screwed into body 15 is the mandrel holding member 23 which is a snug fit with body 15 at 16 and 17 but is circumferentially recessed at 24 to form the annular polymer header 2. Recessed portion 24 terminates in conical surface 25 which is concentrically parallel to and uniformly spaced from countersunk coned surface 19 and forms therewith conical annular duct 3 and annular discharge mouth 22. The width of conical duct 3 is adjusted by shim 26 according to the wall thickness requirements of the tubing being produced.

The mandrel holding member 23 contains cylindrical holes 27 and 28 and recess 29. Hole 27 is a close fit with the periphery of mandrel 5 and holds it firmly in place. Hole 28 is slightly larger in diameter than mandrel 5 and forms therewith a narrow annular channel through which lubricant is brought from duct 9 to the inner lip 11 of polymer discharge nozzle 22.

Recesses 16 and 17, countersunk coned surface 19, sharp edged hole 21, discharge nozzle 22, holes 27 and 28, recess 29, and the periphery of mandrel 5 are all aligned concentrically about the common longitudinal axis of body 15, mandrel holding member 23, and mandrel 5.

An extrusion is started with the mandrel 5 pulled up into the head so that the base of the mandrel is about flush with that of the extrusion head. As soon as the extruded polymer necks down and covers the oiled base of the mandrel, it is pushed into the position indicated in Fig. 1 and the tubing is pulled off.

*Example I*

Polyhexamethylene adipamide, prepared from hexamethylene diammonium adipate in accordance with the method described in U. S. Patent No. 2,130,948, is melted by heating to 285° C. The molten polymer is forced at constant rate into an extrusion head such as that illustrated in Fig. 1. The body and mandrel-holding member of the head are maintained at 275° C. by means of external heating elements. The mandrel, which has an external diameter of 0.5 inch, is internally cooled with water and the portion protruding below the extrusion head is held at about 25° C. A high boiling, relatively heat stable hydrocarbon, obtained by polymerizing isobutylene, is forced into the lubricant duct of the mandrel-holding member and emerges from the base of the extrusion head on the cooled mandrel under the molten polymer. Polymer is discharged from the conical duct as a radially converging frustrocone which impinges on the mandrel just below the nozzle, or not farther than approximately a quarter of an inch below the nozzle, and is rapidly cooled and congealed to a tubular structure having a wall thickness of 0.015 in. and an inside diameter of 0.5 in. The tubing is transported along the mandrel at a rate of 15 ft. per minute with pulleys similar to those illustrated in Figs. 2 and 3.

The tubing is hole-free, transparent, flexible, highly resistant to tear and abrasion, and is unattacked by most common organic solvents.

*Example II*

Polyhexamethylene sebacamide, prepared from hexamethylene diammonium sebacate, is melted and extruded from a tube-forming head similar to that employed in Example I but having a 1 in. diameter mandrel. Using olive oil as a lubricant, transparent tubing having a wall thickness of 0.0005 in. is made at the rate of 52 ft. per min. The thin walled tubing is collapsed to a band below the mandrel and pulled from the latter by means of driven rolls.

In the foregoing examples the effecting of a sufficiently loose contact between the shaping member and the tubing, to facilitate convenient removal of the latter, intact, was accomplished by pre-modifying the contact at the interface between the tubular film and the surface of the shaping member. That is, lubricant was applied over the said surface in advance of the impingement of the said film thereupon. By employing a shaping member having permeable walls, a similar result can be accomplished by directing lubricant therethrough, after the setting up of the tubing on the said member, however, rather than before such setting up. Or, the necessary lubricating effect may be obtained by the application, externally of the solidified film, of a liquid which is permeative with respect to the said film. These procedures are best adapted of course to the removal of stationary films from shaping members on which they have been formed while not in motion rather than to the removal of films which are extruded by the normally continuous process described hereinabove. A still further method of non-injuriously loosening or disturbing the contact at the interface between a tubular film and a shaping member, to the external surface of which it is adherent, or about the external surface of which it has been tightly shrunk, involves the use of a mandrel or core which is expansible, as, for example, vulcanized rubber, and the expansion of the same, as by the introduction of compressed air or of a mechanical expanding agency. The said film thus is stretched just enough to disturb the said contact without doing injury to the film itself.

Non-extrusion methods for forming tubular films on shaping members, entailing need for resort to procedures such as those just described, are set forth below. It may be observed in connection with them, that when molten synthetic linear polyamide is solidified it shrinks to a surprising extent, wherefore the problem of satisfactorily removing the formed tubing from the shaping member becomes both very acute and very formidable. In each of the procedures described below such solidification from melt either is, or may become, involved.

Although extruding molten polymer onto a mandrel constitutes the preferred embodiment of this invention, other methods for applying the polymer can be used. One such method consists in passing a mandrel through an aqueous dispersion of polyamide particles and then through a furnace wherein the water evaporates and the polyamide particles melt to form a continuous film about the mandrel. The mandrel and coating are then cooled by quenching in water, after which the process is repeated until a tubular film of the desired thickness is obtained. The tubular film is removed by soaking it for at least 0.5 hour in water and then turning the tubing inside out. In place of using a dispersion of the polymer as the source of the film, true solutions of polyamide in volatile solvents can be used. For example, the interpolyamide derived from 60 parts of hexamethylene diammonium adipate and 40 parts of caprolactam can be applied to a mandrel from a 7% solution in a 2:1 by weight mixture of chloroform and methanol. Shaping mandrels can also be dipped into molten polymer, the excess polymer removed, and the coating congealed and removed.

Polymers suitable for use in this invention include those synthetic linear polymers which have recurring amide linkages as an integral part of the main chain of atoms in the polymer, such as the hereinabove mentioned superpolyamides which are described in U. S. Patents 2,071,250, 2,071,253, 2,130,523, and 2,130,948. These polyamides are obtained from bifunctional polyamide-forming reactants, as essentially sole reactants. Linear superpolymers prepared by including other bifunctional reactants such as amino alcohols and hydroxy acids with the polyamide-forming reactants also may be used.

The synthetic linear polymers which are the most useful in the manufacture of seamless tubing are those having an intrinsic viscosity above 0.4, where intrinsic viscosity is defined as in U. S. Patent 2,130,948. They may be modified by the addition of other materials, as, for instance, plasticizers, organic and inorganic fillers, waxes, resins, pigments, dyes, antioxidants and opacifiers.

In the practice of this invention wherein a tubular film of molten polyamide is extruded onto a lubricated, internally cooled, shaping mandrel, the lubricant preferably should be a high boiling material, which, under casting conditions, is thermally stable, and relatively inert with respect to the polyamide. While it is preferred to use lubricants boiling above the melting point of the polyamide, lower boiling materials may be used by maintaining a high pressure in the lubricant duct and channels. Several products derived from petroleum are particularly suitable. Among these are petrolatum, high grade lubricating oils, and polymeric materials made from olefins. The naturally occurring fatty oils also are satisfactory. These include such readily available materials as castor, cottonseed, olive, whale, and lard oil. Numerous other materials may be used, the choice of lubricant usually depending on the purpose for which the tubing is made. For example, glycerine may be used in the manufacture of tubes for dispensing toilet pastes, while an animal or vegetable fatty oil may be employed in making sausage casings.

If heavy walled, transparent tubing is desired, most of the mandrel protruding below the extrusion head may be immersed in water or other suitable liquid in order to supplement the internal cooling. Usually, however, the latter is sufficient.

As hereinabove observed, the loss of heat from the extrusion head in Fig. 1 to the cooling medium is cut down by an insulating liner inside of the hollow mandrel. In addition, or alternatively, the mandrel may be externally insulated, however.

It is significant that the extrusion method illustrated in Examples I and II yields tubing of useful thickness of wall structure, up to about 0.020 inch, for instance, in a single lamina; whereas a plurality of strata or laminae need to be applied and normally are found in the finished tubing when the tubing is made with the use of polymer dispersions or solutions.

Polyamide tubing can be cold drawn as much as 200–400% by pulling in an axial direction, and can be expanded circumferentially by pulling over a mandrel having a larger diameter, or by application of internal pressure. It is also possible to effect both axial and circumferential drawing on the same tubing. Tubing having a tensile strength of 30,000 lbs. per sq. in. or higher can be obtained by orienting the polyamide in the tubing in the foregoing manner.

This invention may be employed in the manufacture of packaging material for such products as sausages, food pastes, greases, industrial pastes, tooth pastes, household cements, cosmetics, and shaving cream. Tubing made according to this invention also may be utilized for electric fuse cartridges, fountain pen barrels, blasting cap shells, telephone plug shells, and the like. The invention further is useful for the manufacture of tubing for fuel and oil lines, particularly those made for service with airplane engines, for paint spray hose, and for numerous other applications requiring toughness, high strength and resistance to organic solvents.

As many apparently widely different embodiments of this invention may be made without departing from the spirit and scope thereof, it is to be understood that the invention is not limited to the specific embodiments thereof except as defined in the appended claims.

I claim:

1. Extrusion head and apparatus for continuously forming from fluid organic material seamless, thin-walled tubing of substantially uniform cross-sectional contour, the said head and apparatus comprising in combination, heating means for maintaining the said organic material fluid while inside said head, an extrusion orifice whose shape and dimensions correspond to those desired for the said tubing at the instant of its extrusion, the said orifice being formed by an external lip perimetrically disposed about a forming member protruding therethrough, means for delivering said organic material through said orifice upon said forming member, means for applying lubricant upon the latter beneath said extruded organic material, means for cooling said organic material to the solid state within one second from the instant of its extrusion, and take-off means for continuously removing the resultant tubing from the forming member.

2. The extrusion head and apparatus of claim 1 wherein the said take-off means comprises a plurality of pulleys with recessed faces, adapted to engage the surface of the solidified tubing and transport the same along said forming member without deforming the tubing.

3. The extrusion head and apparatus of claim 1 wherein the said forming member carries a layer of insulating material adapted to lessen heat transfer from the said head to the said forming member.

4. In combination with the apparatus of claim 1, means for providing cooling liquid to the interior of the protruding part of the said forming member.

5. An extrusion head and apparatus for continuously forming from fiber-forming synthetic linear polymer seamless tubing of substantially uniform cross-sectional contour, the said head and apparatus comprising in combination an extrusion orifice corresponding in shape and dimensions to those desired for the said tubing at the instant of its extrusion, a forming member protruding through said orifice and having its periphery in close proximity thereto for supporting the molten polymer adjacent the point of extrusion, means for delivering said polymer in a molten state through said orifice upon said forming member, means for forcing lubricant between said forming member and the molten polymer extruded thereon, means for cooling the protruding portion of said forming member to rapidly solidify said extruded polymer thereon, and means for continuously removing the solidified tubing from said forming member.

6. An extrusion head and apparatus for continuously forming from fiber-forming synthetic linear polymer seamless tubing of substantially uniform cross-sectional contour, the said head and apparatus comprising in combination an extrusion orifice corresponding in shape and dimensions to those desired for the said tubing at the instant of its extrusion, a forming member protruding through said orifice and having its periphery in close proximity thereto for supporting the molten polymer adjacent the point of extrusion, means for delivering said polymer in a molten state through said orifice upon said forming member, means for forcing lubricant between said forming member and the molten polymer extruded thereon, means for providing cooling fluid to the interior of the protruding portion of said forming member to rapidly solidify said extruded polymer thereon, and means for continuously removing the solidified tubing from said forming member.

7. An extrusion head and apparatus for continuously forming from fiber-forming synthetic linear polymer seamless tubing of substantially uniform cross-sectional contour, the said head and apparatus comprising in combination an extrusion orifice corresponding in shape and dimensions to those desired for the said tubing at the instant of its extrusion, a forming member protruding through said orifice and having its periphery in close proximity thereto for supporting the molten polymer adjacent the point of extrusion, said forming member being adjustable in said head for protruding more or less through said orifice, means for delivering said polymer in a molten state through said orifice upon said forming member, means for forcing lubricant between said forming member and the molten polymer extruded thereon, means for cooling the protruding portion of said forming member to rapidly solidify said extruded polymer thereon, and means for continuously removing the tubing from said forming member.

8. An extrusion head and apparatus for continuously forming from fiber-forming synthetic linear polymer seamless tubing of substantially uniform cross-sectional contour, the said head and apparatus comprising in combination an extrusion orifice corresponding in shape and dimensions to those desired for the said tubing at the instant of its extrusion, a forming member protruding through said orifice and having its periphery in close proximity thereto for supporting the molten polymer adjacent the point of extrusion, means for delivering said polymer in a molten state through said orifice upon said forming member, means for forcing lubricant between said forming member and the molten polymer extruded thereon, means for cooling the protruding portion of said forming member to rapidly solidify said extruded polymer thereon, and means for continuously removing the tubing from said forming member, said removing means comprising a plurality of pulleys with recessed faces engaging the surface of the solidified tubing for transporting the same along said forming member without deforming the tubing.

9. An extrusion head and apparatus for continuously forming from fiber-forming synthetic linear polymer seamless tubing of substantially uniform cross-sectional contour, the said head and apparatus comprising in combination an extrusion orifice corresponding in shape and dimensions to those desired for the said tubing at the instant of its extrusion, a forming member protruding through said orifice and having its periphery in close proximity thereto for supporting the molten polymer adjacent the point of extrusion, means for delivering said polymer in a molten state through said orifice upon said forming member, means for forcing lubricant between said forming member and the molten polymer extruded thereon, said lubricant forcing means comprising an orifice positioned concentrically within said extrusion orifice and closely surrounding said forming member, means for cooling the protruding portion of said forming member to rapidly solidify said extruded polymer thereon, and means for continuously removing the tubing from said forming member.

10. A continuous process of manufacturing seamless tubing of substantially uniform cross-sectional contour from material comprising a fiber-forming synthetic linear polymer, which process comprises melting said polymer, extruding through an orifice said molten polymer in the form of a radially converging frustocone, supporting said radially converging frustocone of molten polymer adjacent the point of extrusion on a forming member protruding through said orifice, forcing a lubricant in the liquid state between said forming member and the radially converging frustocone of molten polymer in advance of its contact with said forming member, cooling the protruding portion of said forming member and rapidly solidifying said extruded polymer thereon, and continuously removing the solidified tubing from said forming member.

11. A process as set forth in claim 10 in which said polymer is synthetic linear polyamide.

12. A process as set forth in claim 10 in which said extruded polymer is solidified within one second after its extrusion through said orifice.

13. A process as set forth in claim 10 in which said radially converging frustocone of molten polymer is supported on said forming member within approximately one quarter of an inch below the point of extrusion.

14. A continuous process of manufacturing seamless tubing of substantially uniform cross-sectional contour from material comprising a fiber-forming synthetic linear polymer, which process comprises melting said polymer, extruding through an orifice said molten polymer in the form of a radially converging frustocone, supporting said radially converging frustocone of molten polymer adjacent the point of extrusion on a forming member protruding through said orifice, forcing a lubricant in the liquid state between said forming member and the radially converging frustocone of molten polymer in advance of its contact with said forming member, introducing a cooling fluid into the interior of the protruding portion of said forming member and rapidly solidifying said extruded polymer thereon, and continuously removing the solidified tubing from said forming member.

15. A continuous process of manufacturing seamless tubing of substantially uniform cross-sectional contour from material comprising a fiber-forming synthetic linear polymer, which process comprises melting said polymer, extruding through an orifice said molten polymer in the form of a radially converging frustocone, supporting said radially converging frustocone of molten polymer adjacent the point of extrusion on a forming member protruding through said orifice, forcing glycerine as a lubricant in the liquid state between said forming member and the radially converging frustocone of molten polymer in advance of its contact with said forming member, cooling the protruding portion of said forming member and rapidly solidifying said extruded polymer thereon, and continuously removing the solidified tubing from said forming member.

ARTHUR WHITNEY LARCHAR.